March 30, 1965 R. ST. HILAIRE 3,175,536
BIRD GRIT CAKE AND HOLDER
Filed May 17, 1963

INVENTOR.
RAYMOND ST. HILAIRE
BY
*B. P. Fishleune, Jr.*
ATTORNEY

United States Patent Office 3,175,536
Patented Mar. 30, 1965

3,175,536
BIRD GRIT CAKE AND HOLDER
Raymond St. Hilaire, Paterson, N.J., assignor of fifty percent to Vasilije Starcev, Paterson, N.J.
Filed May 17, 1963, Ser. No. 281,215
1 Claim. (Cl. 119—51)

This invention relates to a bird grit cake and holder.

An object of the invention is to provide a simplified and economically constructed grit cake and holder, arranged so that the grit cake is fully exposed and unobstructed on all sides thereof and spaced above a platform upon which a bird or birds may alight for pecking the grit cake to obtain the grit and nutrients therein.

Another object is to provide a novel and simplified grit cake holder which may be wall-mounted in any convenient location about the home to form a resting place for parakeets and like birds and thereby helping to eliminate the tendency for these birds to peck at paint and to damage window curtains and like objects in the home.

Another object is to provide a molded grit cake having a socket recess in its bottom for receiving an upstanding post or pin of the support structure removably, whereby after sufficient use the cake may be replaced by a new cake of the desired original shape with great facility.

Another object is to provide a grit cake and holder wherein the cake is elevated above the platform of the holder so that the bird or birds have ready access to all surfaces thereof.

Another object is to provide a bird cake and holder combination which requires no grill work, box or other enclosing means for supporting the cake.

Other objects and advantages of the invention will be apparent during the course of the following detailed description.

Figure 1:
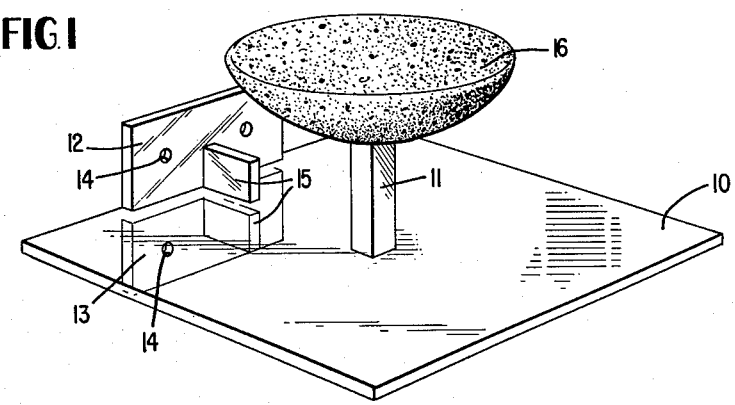
Figure 2:
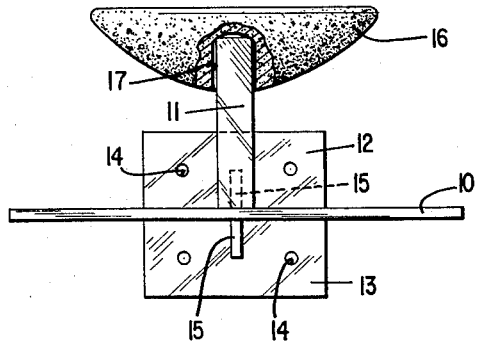

In the accompanying drawings forming a part of this application and in which like numerals are employed to designate like parts throughout the same, FIGURE 1 is a perspective view of a bird cake and holder embodying the invention, and FIGURE 2 is a side elevational view, partly in section, of the same.

In the drawings, wherein for the purpose of illustration is shown a preferred embodiment of the invention, the numeral 10 designates a preferably rectangular platform or plate adapted to be formed of clear plastics material, wood or any other suitable material and being disposed horizontally during use and large enough to form a resting place for a bird or several such birds including parakeets or the like.

The platform 10 has centrally mounted thereon and suitably rigidly secured thereto an upstanding preferably rectangular cake support element or post 11. The height of the post 11 may be varied as may the size of the platform 10 depending upon the size or type of bird or birds to be accommodated.

Bracket means is provided on one side of the platform 10 for attaching it rigidly to a wall or other suitable substantially vertical support. Such means preferably comprises plate sections 12 and 13 arranged above and below one edge portion of the platform 10 and flush with the adjacent edge and rigidly secured in any suitable manner to the platform. The plate sections 12 and 13 are at right angles to the platform 10 and are apertured at 14 to receive screws or the like for fastening the structure to the wall or other support. Brace blocks 15 for the plate sections 12 and 13 may be provided as shown. The support structure thus far described may be formed entirely of plastics material and may be transparent or suitably colored, if preferred. It is unitary and rigid in assembly with no separable parts to become lost or mislaid.

The grit cake or stone 16 or other preferred type of bird cake is prefabricated by molding and may contain certain desired nutrients as well as grit which is beneficial to birds and which allows them to reduce their bills by pecking. The cake 16 is symmetrical in shape about the vertical axis of the post 11 and is preferably circular in plan although this shape is not essential and may be varied. The cake has preferably a broad flat horizontal top surface upon which a bird may alight or rest while pecking the cake. The cake is preferably symmetrically rounded on its bottom side so as to be readily accessible from all sides and from below to a bird or birds on the platform 10. It preferably tapers gradually toward its periphery so that the bird or birds may peck at the relatively narrow edge portion of the cake to more readily dislodge grit and the nutrients therein. By virtue of this shape and the disposition of the cake upon the support, the cake will ordinarily be gradually diminished in size uniformly from its outer periphery inwardly toward the supporting post 11, until only a small fragment of the cake remains, at which time the cake can be removed from the post and easily replaced by a new one or exchanged with a cake having a modified composition also beneficial to birds.

The cake 16 is provided centrally in its bottom with a socket opening 17 conforming to the cross sectional shape of the square post 11 and removably receiving the same, as shown in FIGURE 2. The cake is bodily supported by the post and cannot revolve upon the post due to the interfitting relationship of the square post within the socket recess. The cake is supported in a stable manner and cannot be separated from the support by the bird but may be readily lifted therefrom by hand for replacement. No other means is required to mount the cake detachably upon the supporting structure and no cage, grill work or other enclosing means for the cake is utilized. Therefore, the cake is fully exposed and readily accessible upon all sides thereof including its top and bottom so that the bird may utilize the entire cake without wasting any appreciable part thereof. The advantages of the invention should be readily apparent to those skilled in the art without the necessity for any further description. The construction is highly economical, very compact and neat and attractive in appearance. The platform 10 may also receive any crumbs or grit which drop from the cake or bird droppings. Therefore, the device increases rather than detracting from the neatness of the area in which it is installed.

It is to be understood that the form of the invention herewith shown and described is to be taken as a preferred example of the same, and that various changes in the shape, size and arrangement of parts may be resorted to, without departing from the spirit of the invention or scope of the subjoined claim.

Having thus described my invention, I claim:

A bird grit cake and holder structure comprising in combination a relatively wide flat rigid plate body portion disposed horizontally during use and serving as a platform rest for birds, bracket means rigidly secured to the plate body portion at one marginal edge thereof for attaching the plate body portion to a suitable upright support so that the plate body portion may project outwardly therefrom, a slender vertical post of polygonal cross section secured rigidly to the plate body portion centrally thereof and projecting above the upper face thereof only, and a grit cake mounted upon the top of said post removably and provided in its bottom and centrally thereof with a downwardly opening blind socket recess of like cross sectional shape to said post and receiving the upper end portion of the post and held against turning thereby, said grit cake spaced a substantial distance above the plate body portion and projecting a substantial distance radially outwardly of the post on all sides thereof equidistantly, the periphery of the grit cake terminating a sufficient distance inwardly of the marginal edges of the plate body portion to allow a plurality of birds resting on the plate body portion to peck at the peripheral edge and lower face of the grit cake, the grit cake having a substantially flat top face of considerable width and having a lower face which is inclined downwardly from the peripheral edge of the cake and toward said post to form a body of increasing thickness toward said post, the thickest portion of the grit cake being spaced substantially above the plate body portion.

References Cited by the Examiner

UNITED STATES PATENTS

| | | | |
|---|---|---|---|
| 1,751,388 | 3/30 | Bircher | 119—51 |
| 2,142,825 | 1/39 | Patten | 119—51 |
| 2,661,719 | 12/53 | Scheidt et al. | 119—51 |
| 2,833,247 | 5/58 | Beyea | 119—51 |
| 2,908,250 | 10/59 | Aniser | 119—51 |

FOREIGN PATENTS

| | | |
|---|---|---|
| 1,081,311 | 6/54 | France. |
| 2,406 | 9/05 | Great Britain. |

SAMUEL KOREN, *Primary Examiner.*

ALDRICH F. MEDBERY, *Examiner.*